United States Patent
Kim et al.

(10) Patent No.: US 7,695,181 B2
(45) Date of Patent: Apr. 13, 2010

(54) BACKLIGHT ASSEMBLY, DISPLAY MODULE HAVING THE BACKLIGHT ASSEMBLY AND METHOD OF MANUFACTURING THE BACKLIGHT ASSEMBLY

(75) Inventors: Hwan-Jin Kim, Suwon-si (KR); Young-Bee Chu, Suwon-si (KR); Sang-Hee Lee, Suwon-si (KR); Kyoung-Don Lee, Suwon-si (KR); Jae-Lok Cha, Goyang-si (KR); Ji-Hwan Jang, Seoul (KR); In-Hyuk Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 20 days.

(21) Appl. No.: 12/053,984

(22) Filed: Mar. 24, 2008

(65) Prior Publication Data
US 2008/0232120 A1    Sep. 25, 2008

(30) Foreign Application Priority Data
Mar. 23, 2007 (KR) .................... 10-2007-0028411

(51) Int. Cl.
*F21V 33/00* (2006.01)
(52) U.S. Cl. .................... 362/632; 362/633; 362/634; 362/217.11; 362/249.01
(58) Field of Classification Search .................. 362/632, 362/633, 634, 217.15, 217.11, 249.01
See application file for complete search history.

(56) References Cited

U.S. PATENT DOCUMENTS 7,258,478 B2 * 8/2007 Chiang ..................... 362/633
2005/0276076 A1 12/2005 Shin
2007/0002590 A1 1/2007 Jang et al.

FOREIGN PATENT DOCUMENTS

| JP | 2000-314872 | 11/2000 |
| JP | 2004165031 | 6/2004 |
| JP | 2004-191867 | 7/2004 |
| KR | 1020060019171 | 3/2006 |

OTHER PUBLICATIONS

European Patent Office Communication dated Jul. 21, 2008 including extended European Search Report for EP Application No. 08004460.5.

* cited by examiner

*Primary Examiner*—Laura Tso
(74) *Attorney, Agent, or Firm*—F. Chau & Associates, LLC (57) ABSTRACT

A backlight assembly includes a light source providing light, a mold frame receiving the light source unit and a bottom chassis. The bottom chassis includes a bottom plate, sidewalls extending from the bottom plate and an extension part bent from at least one of the sidewalls and overlapping an adjacent sidewall. The mold frame and the bottom chassis are integrally formed. The extension part overlaps the adjacent sidewall at a corner of the bottom chassis. Thus, the torsional strength of the bottom chassis and a backlight assembly having the bottom chassis is improved. The torsional strength is maintained when a backlight assembly is manufactured.

22 Claims, 6 Drawing Sheets

BACKLIGHT ASSEMBLY, DISPLAY MODULE HAVING THE BACKLIGHT ASSEMBLY AND METHOD OF MANUFACTURING THE BACKLIGHT ASSEMBLY

CROSS-REFERENCE TO RELATED APPLICATION

This application claims priority under 35 U.S.C. §119 to Korean Patent Application No. 2007-28411, filed on Mar. 23, 2007 in the Korean Intellectual Property Office (KIPO), the contents of which are herein incorporated by reference in their entirety.

BACKGROUND OF THE INVENTION

1. Technical Field

The present invention relates to a backlight assembly and a display module having the backlight assembly and a method of manufacturing the backlight assembly, and more particularly, to a backlight assembly having improved strength.

2. Discussion of the Related Art

A flat panel display device includes a liquid crystal display (LCD) device, an organic light-emitting display (OLED) device, a plasma display panel (PDP) device and so on. The flat panel display device can be thinner and lighter than other types of display devices.

The LCD device includes an array substrate, a countering substrate and a liquid crystal layer. Thin-film transistors (TFTs) are formed on the array substrate. The liquid crystal layer is disposed between the array substrate and the countering substrate, and has an anisotropic dielectric constant. An electric field is applied to the liquid crystal layer, and an amount of light transmitted through the substrate is controlled by the intensity of the electric field. An image is displayed by adjusting the intensity of the electric field.

LCD devices can be used as small display devices in mobile phones, portable game devices, or portable display devices.

Small display devices have become slimmer. As the display devices become thinner, the strength of the display devices may be reduced. Therefore, the small display device may be easily damaged by external impacts.

SUMMARY OF THE INVENTION

Embodiments of the present invention provide a backlight assembly having improved torsion strength, a display module having the backlight assembly and a method of manufacturing the display module.

A backlight assembly according to an exemplary embodiment of the present invention includes a light source providing light, a mold frame receiving the light source unit and a bottom chassis.

The bottom chassis includes a bottom plate, sidewalls extending from the bottom plate and an extension part bent from at least one of the sidewalls and overlapping an adjacent sidewall. The mold frame and the bottom chassis may be integrally formed. The extension part may overlap the adjacent sidewall at a corner of the bottom chassis.

A first hole may be formed at the extension part, and a second hole corresponding to the first hole may be formed at the sidewalls overlapping the extension part, and the first hole may overlap the second hole.

In an exemplary embodiment, a combination part may be formed at a side of the mold frame, and the combination part may be formed to penetrate the first hole and the second hole.

The first and the second holes may be formed in a circular shape, and a cross-section of the combination part may be formed in a circular shape.

A cross-section of an end portion of the combination part may be slightly larger than cross-sections of the first and the second holes.

The first and the second holes may be formed in a rectangular shape, and a cross-section of the combination part may be formed in a rectangular shape.

The extension part may overlap the adjacent extension part at a corner of the bottom chassis, and the extension part may combine with the adjacent extension part.

A hole may be formed at an overlapping part of the extension part and the adjacent extension part.

A combination part may be formed at a side of the mold frame, and the combination part may penetrate the hole.

The hole may be formed in a rectangular shape having a center at the corner of the bottom chassis, and a cross-section of the combination part may be formed in a rectangular shape.

The extension part may include a curve at the corner of the bottom chassis.

The sidewall may include a hemming structure. For example, at least one extended portion of the first, second, third and fourth sidewalls may be bent in a perpendicular direction to the bottom plate to form the hemming structure.

A display module in accordance with an exemplary embodiment of the present invention includes a display panel, a light source unit providing the display panel with light, a mold frame and a bottom chassis. The mold frame receives the backlight unit. The bottom chassis includes a bottom plate, first, second, third and fourth sidewalls extending from the bottom plate and an extension part bent from at least one of the first, second, third and fourth sidewalls and overlapping the adjacent sidewall.

The mold frame and the bottom chassis may be integrally formed. The extension part may overlap the adjacent sidewall at a corner of the bottom chassis.

The second and fourth sidewalls may respectively include extension parts extended to the first and third sidewalls, the first and third sidewalls may respectively overlap the extension parts of the second and fourth sidewalls, and holes may be respectively formed at areas of the second and fourth sidewalls overlapping the extension parts of the first and third sidewalls.

A combination part may be formed at a side of the mold frame, and the combination part may be formed to penetrate the holes of the first, second, third and fourth sidewalls.

The first, second, third and fourth holes may be formed in a circular shape, and cross-sections of the combination parts may be formed in a circular shape.

Cross-sections of end portions of the combination parts may be slightly larger than cross-sections of the holes of the first, second, third and fourth sidewalls.

The extension parts may respectively overlap the adjacent extension parts, and holes may be respectively formed at areas of the extension parts overlapping the adjacent extension parts.

Combination parts may be disposed at sides of the mold frame, and the combination parts may respectively penetrate the holes of the extension parts of the first, second, third and fourth sidewalls.

The holes of the first, second, third and fourth sidewalls may be respectively formed in a rectangular shape having a center at the corner of the bottom chassis, and a cross-section of the combination part is formed in a rectangular shape.

The sidewall may include a hemming structure.

In a method of manufacturing a backlight assembly according to an exemplary embodiment of the present invention, a bottom chassis is formed. In the method, a hole is formed, and an extension part is folded, and the bottom chassis is combined. In the process of forming the bottom chassis, the bottom chassis includes a bottom plate, first, second, third and fourth sidewalls extending from the bottom plate, and an extension part bent from at least one of the first, second, third and fourth sidewalls and overlapping an adjacent sidewall. In the process of forming the hole, the hole is formed at an end portion of the extension part and at an end portion of the sidewall. In the process of folding the extension part, the extension part is folded to overlap the hole of the extension part with the hole of the adjacent sidewall. In the process of forming the bottom chassis, the bottom chassis is combined with the mold frame so that a part of the mold frame penetrates the overlapped holes.

Extension parts may be respectively formed to be extended from the first and third sidewalls, the extension parts may respectively be extended to the adjacent sidewalls, and the extension parts may respectively overlap the second and fourth sidewalls.

The holes of the first, second, third and fourth sidewalls and the holes of the extension parts may be formed in a circular shape.

Cross-sections of end portions of the part of the mold frame may be slightly larger than cross-sections of the holes penetrated by the part of the mold frame.

The holes of the first, second, third and fourth sidewalls and the holes of the extension parts may be formed in a rectangular shape. Cross-sections of end portions of the part of the mold frame may be slightly larger than cross-sections of the holes penetrated by the part of the mold frame.

The sidewall may include a hemming structure. For example, at least one extended portion of the first, second, third and fourth sidewalls may be bent in a perpendicular direction to the bottom plate to form the hemming structure.

According to an exemplary embodiment of the present invention, the torsional strength of the bottom chassis and a backlight assembly having the bottom chassis is improved.

BRIEF DESCRIPTION OF THE DRAWINGS

Exemplary embodiments of the present invention can be understood in more detail from the following descriptions taken in conjunction with the accompanying drawings wherein.

DESCRIPTION OF THE EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein.

Figure 1:
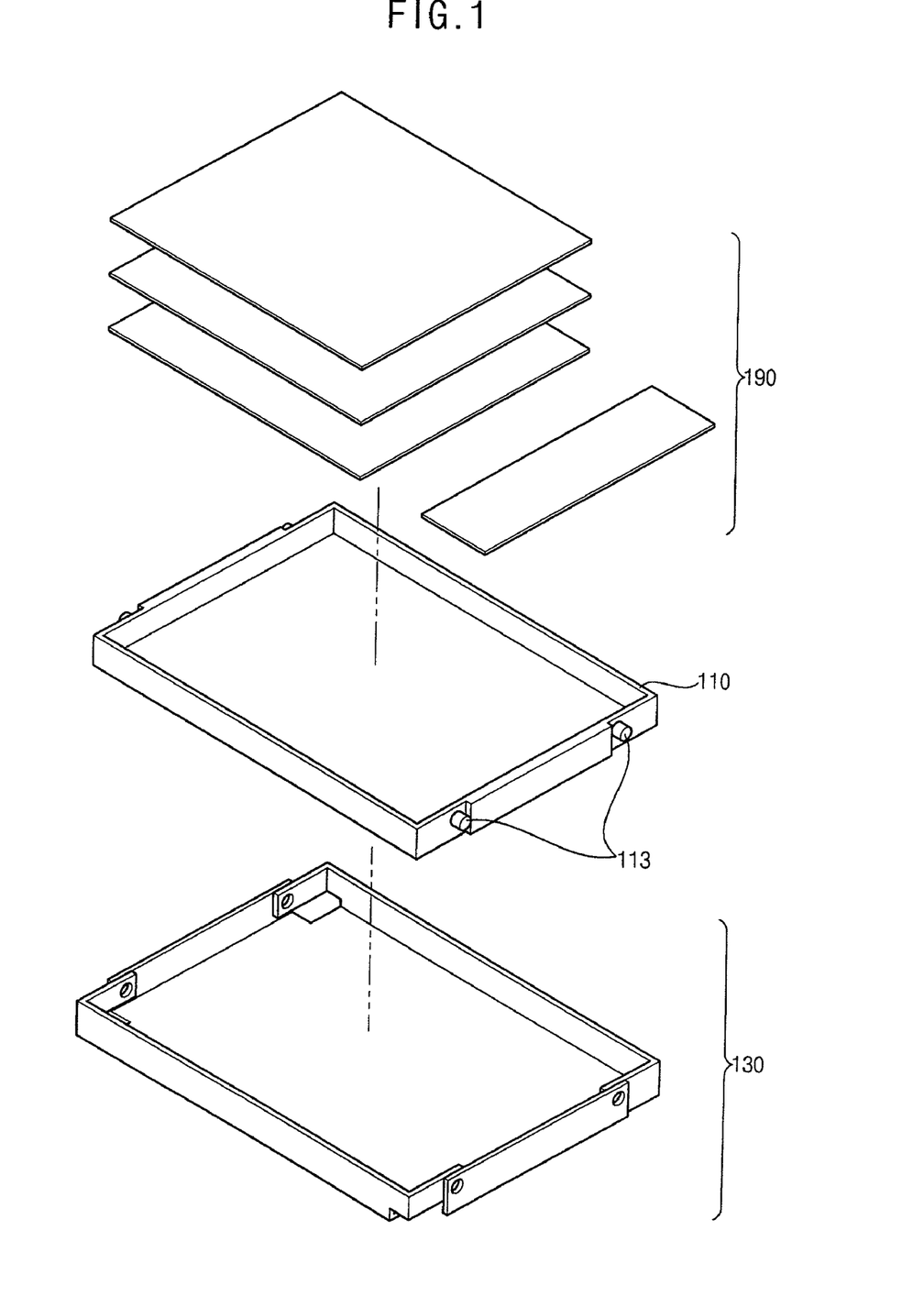
FIG. 1 is an exploded perspective view illustrating a backlight assembly in accordance with an exemplary embodiment of the present invention.

FIG. 1 is an exploded perspective view illustrating a backlight assembly in accordance with an exemplary embodiment of the present invention.

Referring to FIG. 1, a backlight assembly in accordance with an exemplary embodiment of the present invention includes a light source unit 190, a mold frame 110 and a bottom chassis 130.

The light source unit 190 includes a light source (not shown), a light-guide plate (not shown) and an optical sheet (not shown). The light source may include a point light source or a light-emitting diode (LED). The number of point light sources may differ according to the size of a display panel and a required brightness level.

The light-guide plate guides the light generated from the light source, and emits the light toward the display panel. For example, the light-guide plate may include a transparent material to reduce leakage of light. In an exemplary embodiment, the light-guide plate may be formed in a plate shape or a wedge shape.

The optical sheet improves the brightness of the light emitted from the light-guide plate. For example, the optical sheet may include a reflective sheet, a diffusion sheet and/or a prism sheet.

The reflective sheet is disposed under the light-guide plate, and improves the efficiency of the light by reflecting leakage light to the inside of the light-guide plate. The diffusion sheet is disposed on the light-guide plate, and diffuses the light emitted by the light-guide plate. The prism sheet is disposed on the diffusion sheet, and condenses the light emitted from the diffusion sheet. For example, the prism sheet may include vertical and horizontal prism sheets condensing the light in vertical and horizontal directions, respectively.

The mold frame 110 surrounds the light source unit 190 to expose an upper face of the light source unit 190. The mold frame 110 fixes the light source unit to the display panel. The mold frame 110 guides and supports the display panel. For example, the mold frame 110 may include a rectangular shape.

The bottom chassis 130 covers the mold frame 110. The bottom chassis 130 may be formed in a rectangular shape. The bottom chassis 130 may be integrally formed with the mold frame 110. An insert molding method may be used. The insert molding method is one of the methods used to integrally form a chassis and a mold frame. In the insert molding method, a pre-manufactured press frame is disposed at a mold, and a product is formed by processes substantially same as an injection molding method. In the insert molding method, adhesion between the press frame and the mold may be improved, and strength may be greater than a general injection mold because of the high strength of the press frame.

Figure 2:
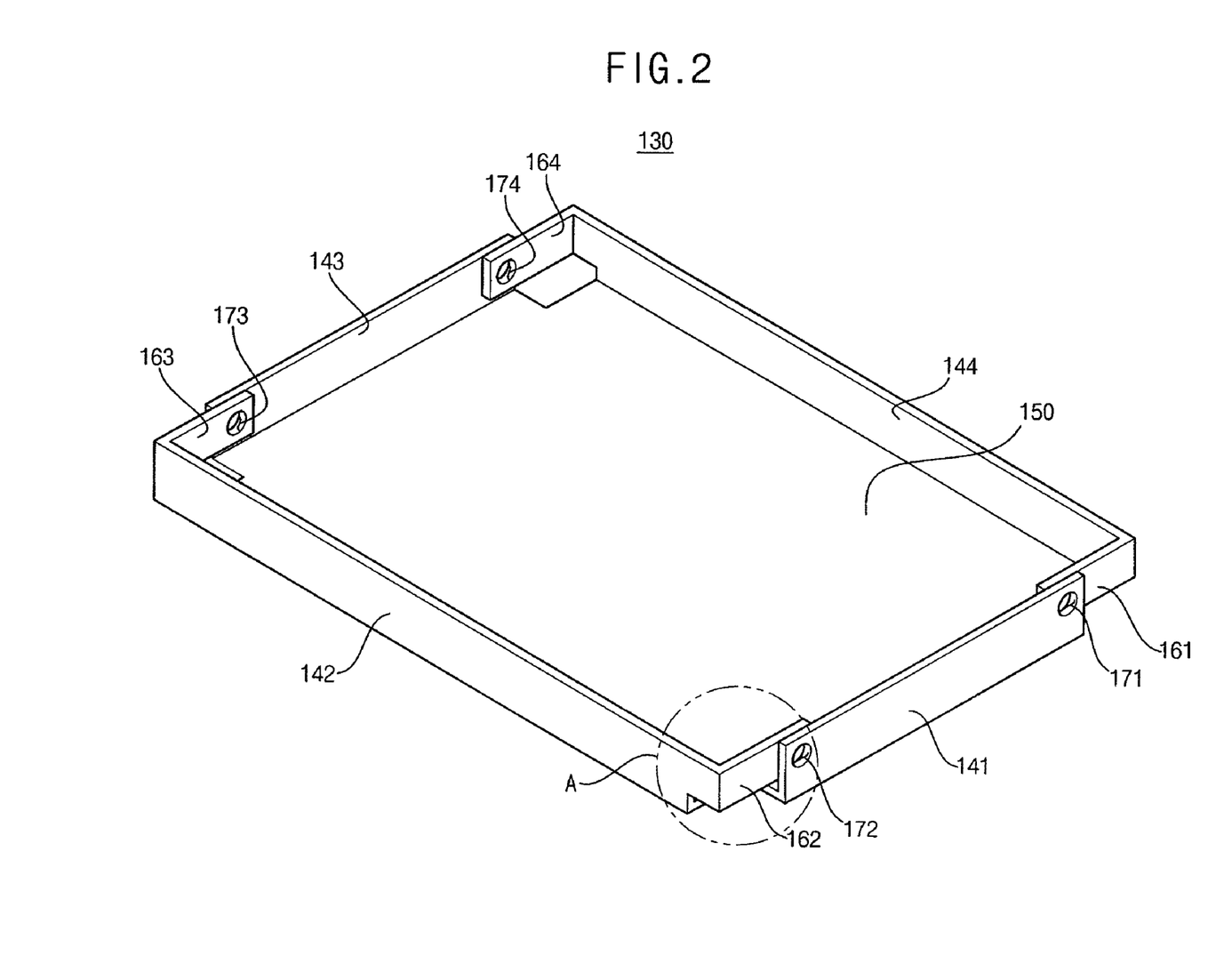
FIG. 2 is a perspective view illustrating the bottom chassis shown in FIG. 1.

FIG. 2 is a perspective view illustrating the bottom chassis in FIG. 1.

Referring to FIG. 2, the bottom chassis 130 includes a first sidewall 141, a second sidewall 142, a third sidewall 143, a fourth sidewall 144 and a bottom part 150. A second extension part 162 and a third extension part 163 are formed at opposite end portions of the second sidewall 142. A first extension part 161 and a fourth extension part 164 are formed at opposite end portions of the fourth sidewall 144.

As illustrated in FIG. 2, the first extension part 161, the second extension part 162, the third extension part 163 and the fourth extension part 164 are formed. In an exemplary embodiment, at least one extension part may be partially formed.

A first combination hole 171, a second combination hole 172, a third combination hole 173 and a forth combination hole 174 are formed at end portions of the first extension part 161, the second extension part 162, the third extension part 163 and the fourth extension part 164, respectively.

The second extension part 162 extended from the second sidewall 142 is bent and overlaps the first sidewall 141. The third extension part 163 extended from the second sidewall 142 is bent and overlaps the third sidewall 143. The first extension part 161 extended from the fourth sidewall 144 is bent and overlaps the first sidewall 141. The fourth extension part 164 extended from the fourth sidewall 144 is bent and overlaps the third sidewall 143.

A first combination hole 171, a second combination hole 172, a third combination hole 173 and a fourth combination hole 174 are formed at the end portions of the first extension part 161, the second extension part 162, the third extension part 163 and the fourth extension part 164, respectively. The combination holes are formed at the first sidewall 141 and the third sidewall 143 corresponding to the first combination hole 171, the second combination hole 172, the third combination hole 173 and the fourth combination hole 174.

The first combination hole 171 and the second combination hole 172 are formed at opposite end portions of the first sidewall 141. The third combination hole 173 and the fourth combination hole 174 are formed at opposite end portions of the third sidewall 143.

The first sidewall 141, the second sidewall 142, the third sidewall 143 and the fourth sidewall 144 are linked to an adjacent sidewall at corners of the mold frame through the first extension part 161, the second extension part 162, the third extension part 163 and the fourth extension part 164.

Figure 3:
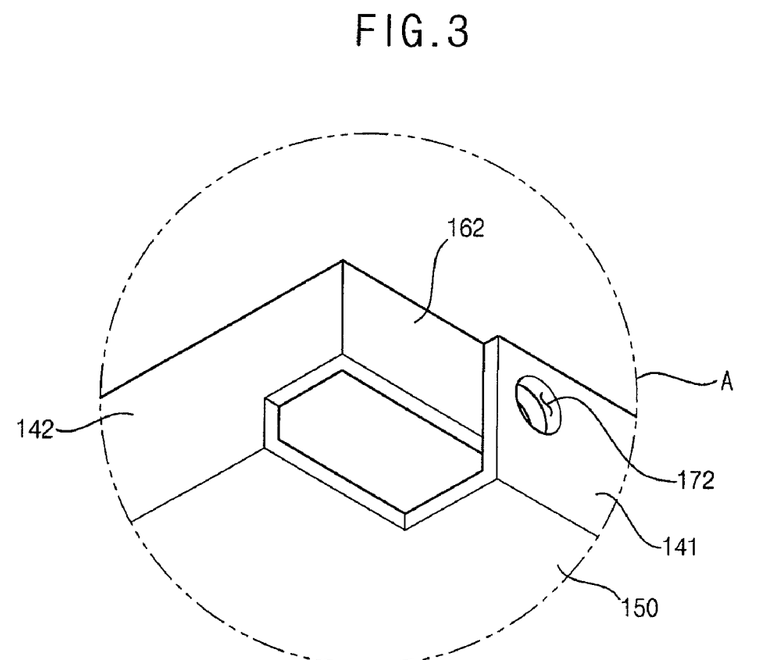
FIG. 3 is an enlarged perspective view illustrating a corner part of the bottom chassis shown in FIG. 2.
Figure 4:
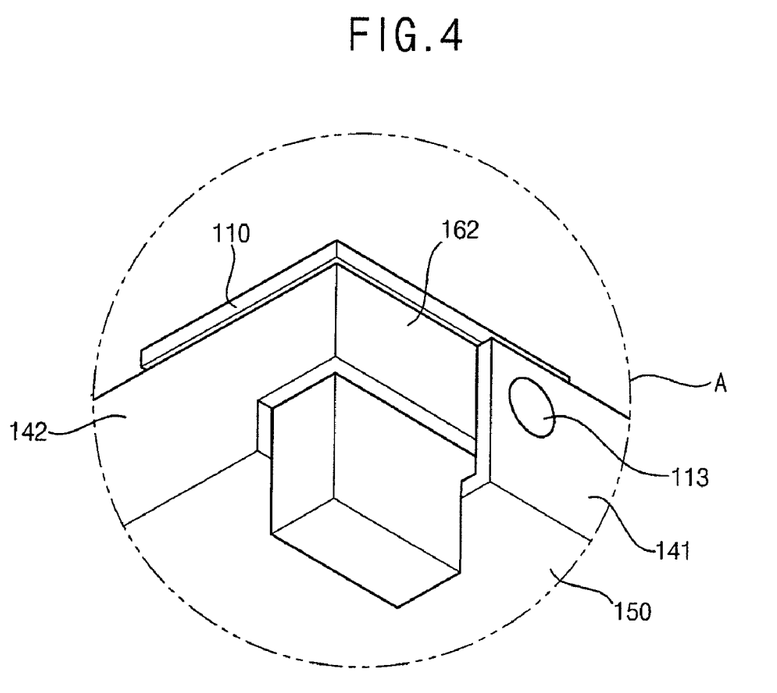
FIG. 4 is an enlarged perspective view illustrating the bottom chassis shown in FIG. 3 combined with a mold frame.

FIG. 3 is an enlarged perspective view illustrating a corner part of the bottom chassis in FIG. 2. FIG. 4 is an enlarged perspective view illustrating the bottom chassis in FIG. 3 combined with a mold frame.

FIGS. 3 and 4 are enlarged perspective views of the corner part A of the bottom chassis 130.

Referring to FIGS. 3 and 4, the first sidewall 141 and the second sidewall 142 are combined with each other through the second extension part 162. In an exemplary embodiment, the second extension part 162 is extended from the second sidewall 142 and bent and overlaps the first sidewall 141. The second combination hole 172 is formed at a part of the first sidewall 141 overlapping the second extension part 162.

FIG. 4 is a perspective view illustrating the bottom chassis 130 integrally formed with the mold frame 110. The mold frame 110 includes a combination part 113. The combination part 113 is formed in a shape corresponding to the second combination hole 172, and penetrates the second combination hole 172. The combination part 113 combines the second extension part 162 with the first sidewall 141. Thus, the second sidewall 142 and the first sidewall 141 may be combined.

In an exemplary embodiment, when the second combination hole 172 is formed in a circular shape, the combination part 113 is formed in a circular shape to correspond to the second combination hole 172.

When the second combination hole 172 is formed in a rectangular shape, the combination part 113 is formed in a rectangular shape to correspond to the second combination hole 172.

As mentioned above, the mold frame 110 is formed in the insert molding method. The insert molding method is one of the methods used to integrally form a chassis and a mold frame. In the insert molding method, a pre-manufactured press frame is disposed at a mold, and a product is formed by processes substantially same as an injection molding method.

The first sidewall 141 of the bottom chassis 300 overlaps the second extension part 162, and the second extension part 162 is disposed to be matched with the second combination hole 172. A mold frame is molded by the insert molding method to form the combination part 113 at the second combination hole 172.

An end portion of the combination part 113 of the mold frame 110 may be formed slightly larger than the second combination hole 172. The end portion of the combination part 113 is formed slightly larger than the second combination hole 172, and prevents the first sidewall 141 and the second extension part 162 from separating.

The second combination hole 172 of the second extension part 162 is formed smaller than the second combination hole 172 of the first sidewall 141. A stepped portion is formed in the second combination hole 172, and the combination part 113 of the mold frame 110 has a stepped portion corresponding to the stepped portion in the second combination hole 172 to prevent the second extension part 162 from separating.

Figure 5:
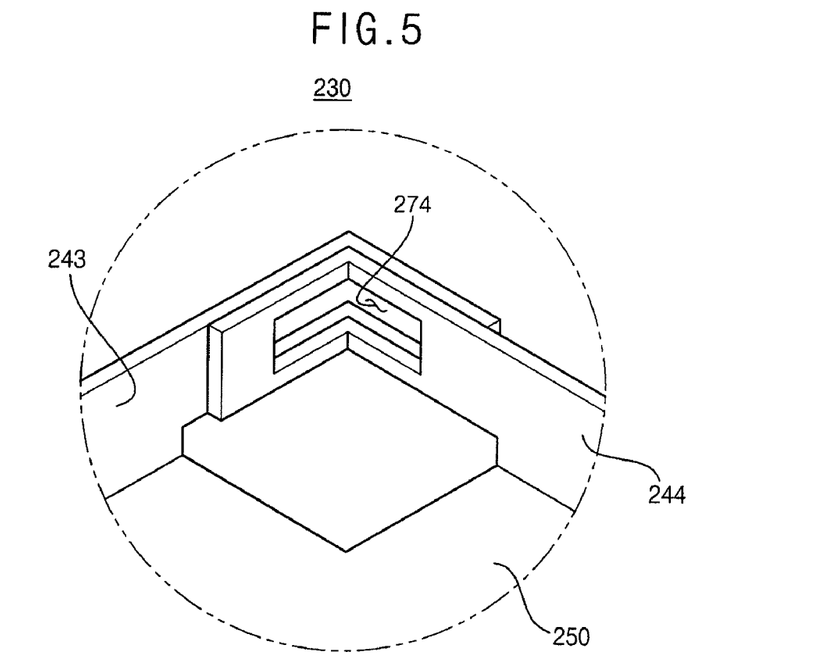
FIG. 5 is an enlarged perspective view illustrating a corner part of a bottom chassis in accordance with an exemplary embodiment of the present invention.

FIG. 5 is an enlarged perspective view illustrating a corner part of a bottom chassis in accordance with an exemplary embodiment of the present invention.

Referring to FIG. 5, a bottom chassis 230 in accordance with an exemplary embodiment of the present invention includes a first sidewall (not shown), a second sidewall (not shown), a third sidewall 243, a fourth sidewall 244 and a bottom part 250.

The third sidewall 243 and the fourth sidewall 244 are extended in different sidewall directions, and overlap each other at a corner part of the bottom chassis 230. A fourth combination hole 274 is formed at an end portion of the third sidewall 243 and the fourth sidewall 244.

Figure 6:
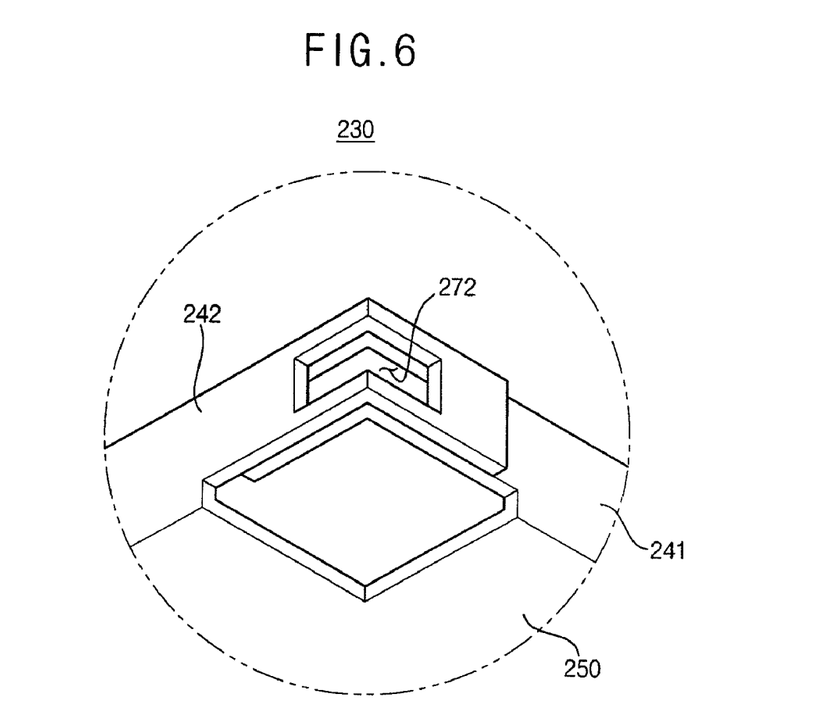
FIG. 6 is an enlarged outer perspective view illustrating the corner part of the bottom chassis shown in FIG. 5.
Figure 7:
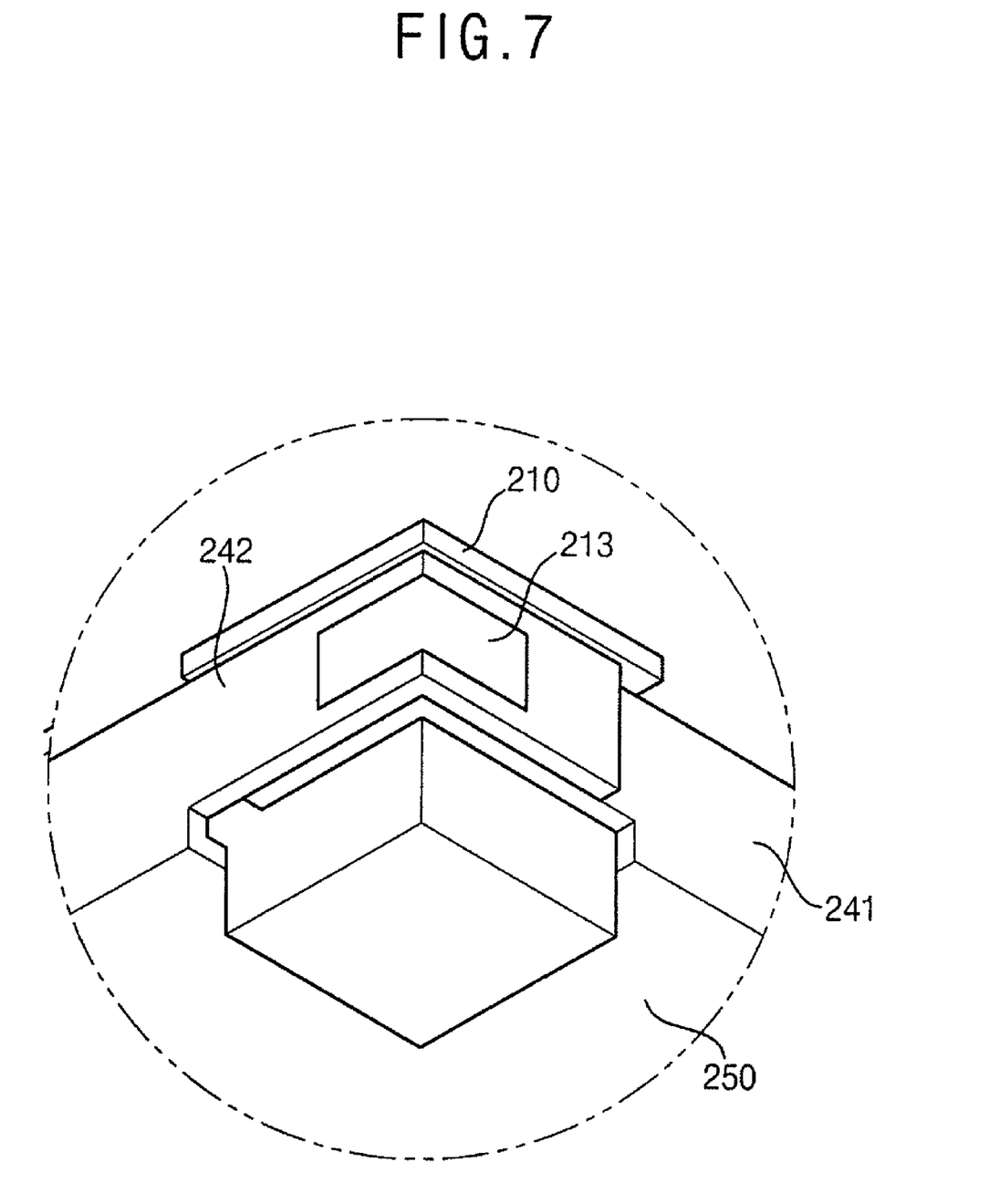
FIG. 7 is an enlarged perspective view illustrating the corner part of the bottom chassis shown in FIG. 6 combined with a mold frame.

FIG. 6 is an enlarged outer perspective view illustrating the corner part of the bottom chassis in FIG. 5. FIG. 7 is an enlarged perspective view illustrating the corner part of the bottom chassis in FIG. 6 combined with a mold frame.

FIGS. 6 and 7 are enlarged perspective views of a corner of the bottom chassis 230.

Referring to FIGS. 6 and 7, a first sidewall 241 and a second sidewall 242 are extended toward each other and overlap with each other. The first sidewall 241 is extended in a longitudinal direction of the first sidewall 241, and is also bent and extended in a longitudinal direction of the second sidewall 242. The second sidewall 242 is extended in the longitudinal direction of the second sidewall 242, and is also bent and extended in the longitudinal direction of the first sidewall 241. Thus, the first sidewall 241 and the second sidewall 242 are extended toward each other and overlap with each other.

FIG. 7 is a perspective view illustrating the bottom chassis 230 integrally formed with the mold frame 210. The mold frame 210 includes a combination part 213. The combination part 213 is formed in a shape corresponding to the second combination hole 272, and penetrates the second combination hole 272. The first sidewall 241 and the second sidewall 242 are combined with each other.

In an exemplary embodiment, when the second combination hole 272 is formed in a circular shape, the combination part 213 is formed in a circular shape to correspond to the second combination hole 272. The second combination hole 272 may be formed in a rectangular shape. When the second combination hole 272 is formed in a rectangular shape, the combination part 213 is formed in a rectangular shape to correspond to the second combination hole 272.

As mentioned above, the mold frame 210 is formed in the insert molding method. The insert molding method is one of the methods used to integrally form a chassis and a mold frame. In the insert molding method, a pre-manufactured press frame is disposed at a mold, and a product is formed by processes substantially same as an injection molding method.

The first sidewall 241 of the bottom chassis 230 overlaps the second sidewall 242, and the second combination holes 272 are disposed to be matched with each other. A mold frame is molded by the insert molding method to form the combination part 213 at the second combination hole 272.

An end portion of the combination part 213 of the mold frame 210 may be formed slightly larger than the second combination hole 272. The end portion of the combination part 213 is formed slightly larger than the second combination hole 272, and prevents the first sidewall 241 and the second sidewall 242 from separating.

The second combination hole 272 of the first sidewall 241 is formed smaller than the second combination hole 272 of the second sidewall 142. A stepped portion is formed in the second combination hole 272, and the combination part 213 of the mold frame 210 has a stepped portion corresponding to the stepped portion in the second combination hole 272 to prevent the second extension part 162 from separating.

Figure 8:
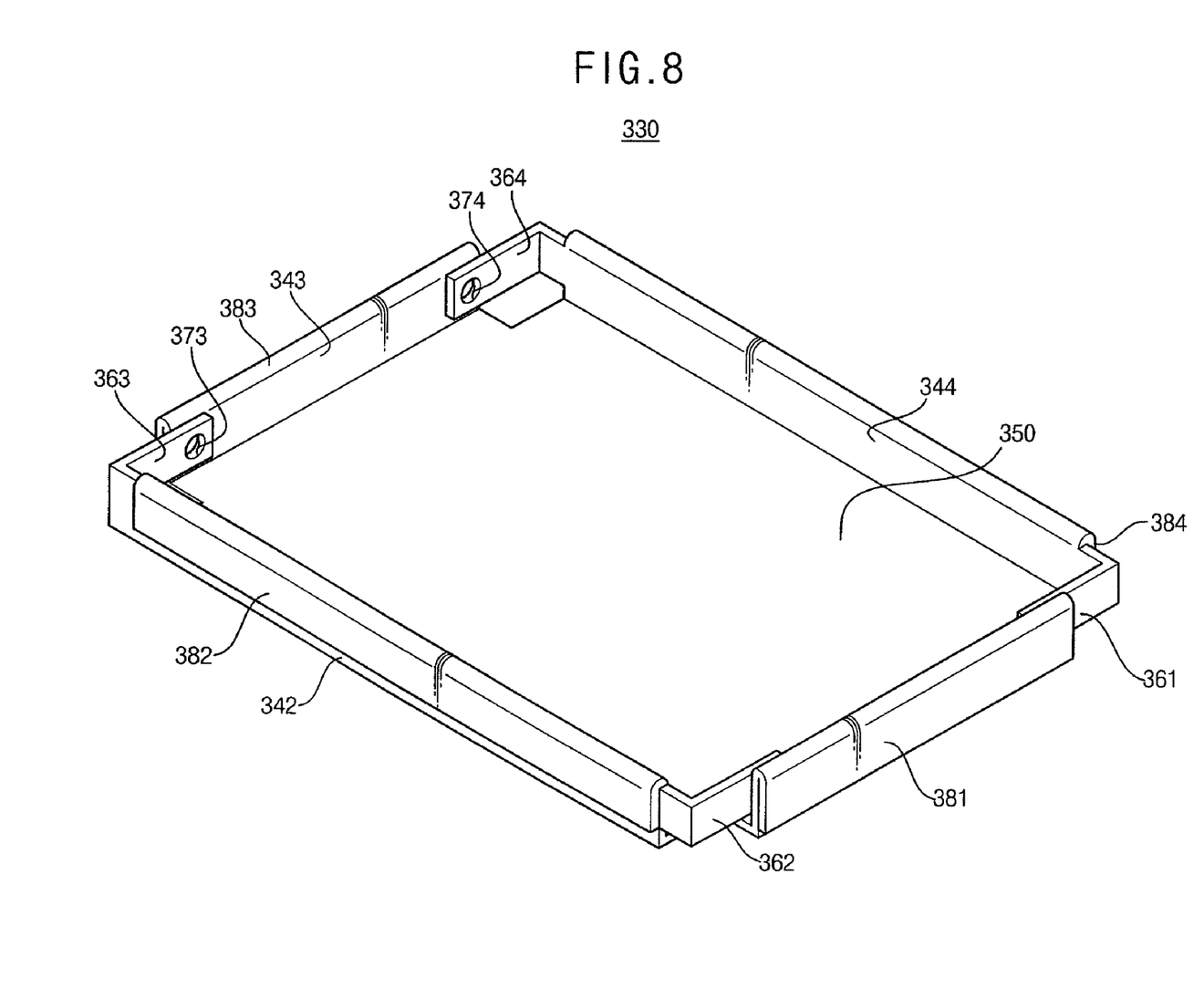
FIG. 8 is a perspective view illustrating a bottom chassis in accordance with an exemplary embodiment of the present invention.

FIG. 8 is a perspective view illustrating a bottom chassis in accordance with an exemplary embodiment of the present invention.

Referring to FIG. 8, a bottom chassis 330 includes a first sidewall 341, a second sidewall 342, a third sidewall 343, a fourth sidewall 344 and a bottom part 350. A second extension part 362 and a third extension part 363 are formed at opposite end portions of the second sidewall 342. A first extension part 361 and a fourth extension part 364 are formed at opposite end portions of the fourth sidewall 344.

The first sidewall 341, the second sidewall 342, the third sidewall 343 and the fourth sidewall 344 may include a hemming structure, and the hemming structure is extended from the bottom part 350 in a perpendicular direction to the bottom part 350 and bent at about 180 degrees.

The first sidewall 341 includes a hemming structure with a first sub-sidewall 381. The second sidewall 342 includes a hemming structure with a second sub-sidewall 382. The third sidewall 343 includes a hemming structure with a third sub-sidewall 383. The fourth sidewall 344 includes a hemming structure with a fourth sub-sidewall 384.

Each of the first, second, third and fourth extension parts may include a hemming structure.

Referring to FIGS. 2 to 3, method for manufacturing a backlight assembly, including a bottom chassis 130, will be explained. Combination holes 171, 172, 173 and 174 are formed, and extension parts 161, 162, 163 and 164 are folded. A mold frame 110 is then formed. A backlight is disposed in the mold frame.

In the process of forming the bottom chassis, the bottom chassis 130 includes a bottom plate 150, first, second, third and fourth sidewalls 141, 142, 143 and 144 and the extension parts 161, 162, 163 and 164 extended from the first, second, third and fourth sidewalls 141, 142, 143 and 144. The extension parts 161, 162, 163 and 164 are formed from at least one sidewall of the first, second, third and fourth sidewalls 141, 142, 143 and 144.

In the process of forming combination holes 171, 172, 173 and 174, combination holes 171, 172, 173 and 174 are formed at end portions of the extension parts and at end portions of the first, second, third and fourth sidewalls 141, 142, 143 and 144.

In an exemplary embodiment, when the extension parts 161, 162, 163 and 164 are extended from the second and fourth sidewalls 142 and 144, the combination holes 171, 172, 173 and 174 may be formed at the end portions of the extension parts, and the combination holes 171, 172, 173 and 174 may be formed at the end portions of the first and third sidewalls 141 and 143. The combination holes 171, 172, 173 and 174 are formed at parts of the extension parts overlapping the sidewalls.

In the process of folding the extension parts 161, 162, 163 and 164, the extension parts are folded to overlap the combination hole of each of the extension parts 161, 162, 163 and 164 with the combination hole of each of adjacent sidewalls. The combination holes 171, 172, 173 and 174 are formed, and the extension parts 161, 162, 163 and 164 of the sidewalls are bent to overlap the combination holes 171, 172, 173 and 174 of the extension parts with the combination holes 171, 172, 173 and 174 of the sidewalls.

In the process of forming the mold frame 110 by an insert molding method, the bottom chassis is integrally formed with the mold frame, and a part of the mold frame penetrates the overlapped combination holes 171, 172, 173 and 174.

The insert molding method is one of the methods used to integrally form a chassis and a mold frame. In the insert molding method, a pre-manufactured press frame is disposed at a mold, and a product is formed by processes substantially same as an injection molding method.

In a method of manufacturing a bottom chassis in accordance with an exemplary embodiment, a bottom chassis 250 including a bottom plate, sidewalls 243 and 244 and extension parts is formed. The sidewalls include first, second, third and fourth sidewalls, and the extension parts are extended from the sidewalls.

In the process of forming combination holes, the combination holes are formed at end portions of the first, second, third and fourth sidewalls. Thus, the combination parts are formed at the end portions of all extension parts.

Referring to FIG. 5, the combination hole 274 is formed at the end portions of the third sidewall 243 and the forth sidewall 244.

In the process of folding the extension parts, the extension parts are folded to overlap the combination hole of each of the extension parts with the combination hole of each of the adjacent sidewalls. The combination holes are formed, and the extension parts of the sidewalls are bent to overlap the combination holes of the extension parts with the combination holes of the bent extension parts. Referring to FIGS. 5 and 6, the first, second, third and forth sidewalls 241, 242, 243 and 244 are folded to overlap the combination holes 272 and 274.

In the process of forming the mold frame by an insert molding method, the bottom chassis is integrally formed with the mold frame, and a part of the mold frame penetrates the overlapped combination holes.

Referring to FIG. 7, the part 213 of the mold frame 210 penetrates the overlapped combination hole 272.

The combination holes, for example, may be formed in a rectangular shape. A part of the mold frame penetrating the overlapped combination holes may be formed in a rectangular shape.

In the process of disposing the backlight in the mold frame, the backlight includes a light source, a light guide plate and an optical sheet.

Each of the extension parts may include a curved face at an overlapping part of each of the extension parts. The extension parts are not bent at about 90 degrees, and the extension parts are curved in a quarter-circle shape.

According to exemplary embodiments of the present invention, sidewalls or extension parts of a bottom chassis overlap at a corner part of the bottom chassis or an adjacent corner part of the bottom chassis. Combination holes are formed at overlapped parts, and a mold frame is molded by an insert molding method. A combination part, as a part of the mold frame, penetrates the combination holes to combine the sidewalls with each other.

Thus, the torsional strength of the bottom chassis and a backlight assembly having the bottom chassis may be improved. The torsional strength may also be maintained although a thickness of a backlight assembly is decreased.

Although the exemplary embodiments of the present invention have been described herein with reference with the accompanying drawings, it is understood that the present invention is not be limited to these exemplary embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A backlight assembly comprising:
    a light source unit generating light;
    a mold frame receiving the light source unit; and
    a bottom chassis including:
        a bottom plate;
        first, second, third and fourth sidewalls extending from the bottom plate;
        an extension part bent from at least one of the sidewalls, wherein the extension part overlaps an adjacent sidewall;
        a first hole formed at the extension part; and
        a second hole corresponding to the first hole, wherein the second hole is formed at the adjacent sidewall overlapping the extension part, the first hole overlapping the second hole,
    wherein a combination part is formed at a side of the mold frame, and the combination part penetrates the overlapped first and the second holes.

2. The backlight assembly of claim 1, wherein the mold frame and the bottom chassis are integrally formed.

3. The backlight assembly of claim 1, wherein the extension part overlaps the adjacent sidewall at a corner of the bottom chassis.

4. The backlight assembly of claim 1, wherein the first and the second holes are formed in a circular shape, and a cross-section of the combination part is formed in a circular shape.

5. The backlight assembly of claim 4, wherein a cross-section of an end portion of the combination part is slightly larger than cross-sections of the first and the second holes.

6. The backlight assembly of claim 1, wherein the first and the second holes are formed in a rectangular shape, and
    a cross-section of the combination part is formed in a rectangular shape.

7. The backlight assembly of claim 1, wherein the extension part overlaps an adjacent extension part at a corner of the mold frame, and is combined with the adjacent extension part at an overlapping part of the extension part and the adjacent extension part.

8. The backlight assembly of claim 7, wherein a hole is formed at the overlapping part of the extension part and the adjacent extension part.

9. The backlight assembly of claim 8, wherein a combination part is formed at a side of the mold frame, and the combination part penetrates the hole.

10. The backlight assembly of claim 9, wherein the hole is formed in a rectangular shape having a center at the corner of the bottom chassis, and a cross-section of the combination part is formed in a rectangular shape.

11. The backlight assembly of claim 10, wherein the extension part comprises a curved face at the corner of the bottom chassis.

12. The backlight assembly of claim 1, wherein the sidewall comprises a hemming structure.

13. A display module comprising:
    a display panel;
    a light source unit providing light to the display panel;
    a mold frame receiving the backlight unit; and
    a bottom chassis including:
        a bottom plate;
        first, second, third and fourth sidewalls extending from the bottom plate;
        an extension part bent from at least one of the first, second, third and fourth sidewalls, wherein the extension part overlaps an adjacent sidewall;
        a first hole formed at the extension part; and
        a second hole corresponding to the first hole, wherein the second hole is formed at the adjacent sidewall overlapping the extension part, the first hole overlapping the second hole,
    wherein a combination part is formed at a side of the mold frame, and the combination part penetrates the overlapped first and the second holes.

14. The display module of claim 13, wherein the mold frame and the bottom chassis are integrally formed.

15. The display module of claim 13, wherein the extension part overlaps the adjacent sidewall at a corner of the bottom chassis.

16. The display module of claim 13, wherein the second and fourth sidewalls respectively comprise extension parts extended to the first and third sidewalls, the first and third sidewalls respectively overlap the extension parts of the second and fourth sidewalls, and holes are respectively formed at areas of the first and third sidewalls overlapping the extension parts of the second and fourth sidewalls.

17. The display module of claim 13, wherein the extension parts respectively overlap the adjacent extension parts, and holes are respectively formed at areas of the extension parts overlapping the adjacent extension parts.

18. The display module of claim 17, wherein combination parts are disposed at sides of the mold frame, and the combination parts respectively penetrate the holes of the extension parts of the first, second, third and fourth sidewalls.

19. The display module of claim 13, wherein the sidewall comprises a hemming structure.

20. A method of manufacturing a backlight assembly, the method comprising:
    forming a bottom chassis, the bottom chassis including a bottom plate, first, second, third and fourth sidewalls extending from the bottom plate, and an extension part bent from at least one of the first, second, third and fourth sidewalls and overlapping an adjacent sidewall;
    forming a first hole at an end portion of the extension part and a second hole at an end portion of the sidewall;
    folding the extension part to overlap the first hole of the sidewall with the second hole of the adjacent sidewall;
    combining the bottom chassis with a mold frame; and
    disposing a light source unit in the mold frame, wherein combining the bottom chassis with a mold frame includes inserting a combination part formed at a side of the mold frame into the overlapped first and the second holes.

21. The method of claim 20, wherein extension parts are respectively formed to be extended from the first and third sidewalls, the extension parts are extended to the adjacent sidewall, and the extension parts respectively overlap the second and fourth sidewalls.

22. The method of claim 20, wherein forming the bottom chassis further comprises bending at least one extended portion of the first, second, third and fourth sidewalls in a perpendicular direction to the bottom plate.

* * * * *